United States Patent
Boul et al.

(10) Patent No.: US 10,087,358 B2
(45) Date of Patent: *Oct. 2, 2018

(54) USE OF SYNTHETIC SMECTITE IN SET-DELAYED CEMENT COMPOSITIONS COMPRISING PUMICE

(71) Applicant: Halliburton Energy Services, Inc., Houston, TX (US)

(72) Inventors: Peter James Boul, Houston, TX (US); Kyriacos Agapiou, Houston, TX (US); Thomas Jason Pisklak, Cypress, TX (US); Ronnie Glen Morgan, Waurika, OK (US); Lance Everett Brothers, Chickasha, OK (US); Pauline Akinyi Otieno, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/415,558

(22) Filed: Jan. 25, 2017

(65) Prior Publication Data

US 2017/0130119 A1    May 11, 2017

Related U.S. Application Data

(60) Division of application No. 14/098,198, filed on Dec. 5, 2013, now Pat. No. 9,580,638, which is a continuation-in-part of application No. 13/417,001, filed on Mar. 9, 2012, now Pat. No. 8,851,173.

(51) Int. Cl.
| | |
|---|---|
| *C04B 28/18* | (2006.01) |
| *C09K 8/467* | (2006.01) |
| *C04B 14/38* | (2006.01) |
| *C04B 24/28* | (2006.01) |
| *C04B 40/06* | (2006.01) |
| *E21B 33/14* | (2006.01) |
| *C04B 103/46* | (2006.01) |
| *C04B 103/40* | (2006.01) |
| *C04B 103/22* | (2006.01) |
| *C04B 103/12* | (2006.01) |

(52) U.S. Cl.
CPC ............ *C09K 8/467* (2013.01); *C04B 14/386* (2013.01); *C04B 24/28* (2013.01); *C04B 28/18* (2013.01); *C04B 40/0658* (2013.01); *E21B 33/14* (2013.01); *C04B 2103/12* (2013.01); *C04B 2103/22* (2013.01); *C04B 2103/408* (2013.01); *C04B 2103/46* (2013.01); *C09K 2208/08* (2013.01)

(58) Field of Classification Search
CPC .... C09K 8/467; C09K 2208/08; C04B 28/18; C04B 14/386; C04B 24/28; C04B 40/0658; C04B 2103/46; C04B 2103/408; C04B 2103/22; C04B 2103/12; E21B 33/14

See application file for complete search history.

(56) References Cited

U.S. PATENT DOCUMENTS

| | | |
|---|---|---|
| 3,238,279 A | 3/1966 | Tarlton |
| 3,557,876 A | 1/1971 | Tragesser |
| 3,867,009 A | 6/1975 | Miller et al. |
| 3,959,003 A | 5/1976 | Ostroot et al. |
| 4,515,216 A | 5/1985 | Childs et al. |
| 4,519,452 A | 5/1985 | Tsao et al. |
| 4,524,828 A | 6/1985 | Sabins et al. |
| 4,676,832 A | 6/1987 | Childs et al. |
| 4,818,288 A | 4/1989 | Aignesberger et al. |
| 5,058,679 A | 10/1991 | Hale et al. |
| 5,263,542 A | 11/1993 | Brothers |
| 5,447,197 A | 9/1995 | Rae et al. |
| 5,547,506 A | 8/1996 | Rae et al. |
| 6,173,778 B1 | 1/2001 | Rae et al. |
| 6,221,148 B1 | 4/2001 | Mathur |
| 6,279,655 B1 | 8/2001 | Pafitis et al. |
| 6,457,523 B1 | 10/2002 | Vijn et al. |
| 6,610,140 B2 | 8/2003 | Vijn et al. |
| 6,616,753 B2 * | 9/2003 | Reddy ................... C04B 22/142 106/705 |
| 6,907,928 B2 | 6/2005 | Di Lullo Arias et al. |
| 6,908,508 B2 | 6/2005 | Brothers |
| 7,086,466 B2 | 8/2006 | Roddy et al. |
| 7,199,086 B1 | 4/2007 | Roddy et al. |
| 7,201,798 B2 | 4/2007 | Brothers et al. |
| 7,338,923 B2 | 3/2008 | Roddy et al. |
| 7,478,675 B2 | 1/2009 | Roddy et al. |
| 7,559,369 B2 | 7/2009 | Roddy et al. |
| 7,575,055 B2 | 8/2009 | Reddy et al. |
| 7,617,870 B1 | 11/2009 | Roddy et al. |
| 7,670,427 B2 | 3/2010 | Perez-Pena |
| 7,674,332 B2 | 3/2010 | Roddy et al. |
| 7,743,828 B2 | 6/2010 | Roddy et al. |
| 7,757,765 B2 | 7/2010 | Hilleary et al. |
| 7,784,542 B2 | 8/2010 | Roddy et al. |
| 7,789,150 B2 | 9/2010 | Roddy et al. |
| 7,806,183 B2 | 10/2010 | Roddy et al. |
| 7,836,954 B2 | 11/2010 | Morgan et al. |
| 7,855,170 B2 | 12/2010 | Perera et al. |

(Continued)

FOREIGN PATENT DOCUMENTS

| | | |
|---|---|---|
| WO | 1996020899 | 7/1996 |
| WO | 2015034477 | 3/2015 |

OTHER PUBLICATIONS

How Microsilica Improves Concrete, Publication #C850327. Copyright 1985, The Aberdeen Group.
Non-final Rejection for U.S. Appl. No. 15/087,961 dated Apr. 17, 2017.

(Continued)

*Primary Examiner* — Anthony J Green
(74) *Attorney, Agent, or Firm* — Craig W. Roddy; Tumey L.L.P.

(57) ABSTRACT

Disclosed herein are cement compositions using set-delayed cement compositions in subterranean formations. The composition may comprise a set-delayed cement composition comprising pumice, hydrated lime, a cement set retarder, a synthetic smectite, and water.

20 Claims, 2 Drawing Sheets

(56) References Cited

U.S. PATENT DOCUMENTS

| | | | |
|---|---|---|---|
| 7,863,224 B2 | 1/2011 | Keys et al. | |
| 7,867,954 B2 | 1/2011 | Warrender et al. | |
| 7,892,352 B2 | 2/2011 | Roddy et al. | |
| 7,964,538 B2 | 6/2011 | Perera et al. | |
| 8,038,790 B1 | 10/2011 | Dubey et al. | |
| 8,048,219 B2 | 11/2011 | Woolfsmith | |
| 8,183,186 B2 | 5/2012 | Luo | |
| 8,226,879 B2 | 7/2012 | Glenolet et al. | |
| 8,297,357 B2 | 10/2012 | Brenneis et al. | |
| 8,307,899 B2 | 11/2012 | Brenneis et al. | |
| 8,403,045 B2 | 3/2013 | Brenneis et al. | |
| 8,476,203 B2 | 7/2013 | Patil | |
| 8,851,173 B2 * | 10/2014 | Brothers | C04B 28/18 106/792 |
| 9,212,534 B2 | 12/2015 | Ballew et al. | |
| 9,255,031 B2 | 2/2016 | Pisklak et al. | |
| 9,255,454 B2 | 2/2016 | Lewis et al. | |
| 9,260,343 B2 | 2/2016 | Brothers | |
| 9,328,281 B2 | 5/2016 | Agapiou et al. | |
| 9,328,583 B2 | 5/2016 | Pisklak | |
| 9,346,711 B2 * | 5/2016 | Chatterji | C04B 22/00 |
| 9,371,712 B2 | 6/2016 | Boul | |
| 9,512,346 B2 | 12/2016 | Roddy | |
| 9,534,165 B2 | 1/2017 | Agapiou | |
| 9,580,638 B2 | 2/2017 | Boul | |
| 9,796,904 B2 * | 10/2017 | Agapiou | C04B 28/18 |
| 2004/0211342 A1 | 10/2004 | Sprouts et al. | |
| 2006/0166834 A1 | 7/2006 | Roddy et al. | |
| 2009/0124522 A1 | 5/2009 | Roddy et al. | |
| 2010/0016183 A1 | 1/2010 | Roddy et al. | |
| 2010/0025039 A1 | 2/2010 | Roddy et al. | |
| 2010/0240556 A1 * | 9/2010 | Keys | C04B 28/34 507/260 |
| 2010/0273912 A1 | 10/2010 | Roddy et al. | |
| 2010/0292365 A1 | 11/2010 | Roddy | |
| 2011/0132605 A1 | 6/2011 | Sarap et al. | |
| 2011/0162845 A1 | 7/2011 | Ravi | |
| 2012/0167803 A1 | 7/2012 | Luo | |
| 2012/0186494 A1 | 7/2012 | Roddy | |
| 2012/0190769 A1 | 7/2012 | Patil | |
| 2012/0192768 A1 | 8/2012 | Ravi | |
| 2012/0211227 A1 | 8/2012 | Thaemlitz | |
| 2012/0214901 A1 | 8/2012 | Bury | |
| 2013/0233550 A1 | 9/2013 | Brothers | |
| 2013/0248183 A1 | 9/2013 | Pisklak | |
| 2014/0034313 A1 | 2/2014 | Pisklak et al. | |
| 2014/0034314 A1 | 2/2014 | Lewis et al. | |
| 2014/0190696 A1 | 7/2014 | Iverson | |

OTHER PUBLICATIONS

Non-final Rejection for U.S. Appl. No. 15/162,245 dated Apr. 21, 2017.
USPTO Office Action for U.S. Appl. No. 14/098,198 dated Jan. 20, 2016.
USPTO Office Action for U.S. Appl. No. 14/098,198 dated Nov. 20, 2014.
USPTO Office Action for U.S. Appl. No. 14/098,198 dated Aug. 12, 2016.
USPTO Office Action for U.S. Appl. No. 14/098,198 dated Jun. 19, 2015.
International Search Report and Written Opinion for PCT/US2014/068804 dated Mar. 17, 2015.
USPTO Notice of Allowance for U.S. Appl. No. 14/098,198 dated Dec. 7, 2016.
Benge et al., "Deep Gas-Well Cementation: A Review of Risks and Design Basis for Use of a Liquid Cement Premix for Large Offshore Cementing Operations", IADC/SPE 98970. pp. 1-5, IADC/SPE Drilling Conference, 2006.
Rae et al., "Liquid Cement Premix Introduces New Solutions to Conventional Cementing Problems", IADC/SPE 35086, pp. 393-400, IADC/SPE Drilling Conference, 1996.
Rae et al., "Liquid Cement Premix for Improved Abandonment and Workover Operations", SPE 36477, pp. 637-643, SPE, Inc., 1996.
Anderson et al., "New Technology Eliminates Bulking in Cementing Operations", SPE 36478, pp. 645-653, SPE, Inc., 1996.
Anderson et al., "New Technology Improves Cement Slurry Design", SPE 36973, pp. 127-136, SPE, Inc., 1996.
Shaefer et al., "Utilizing 'Over-Seas' Technology Improves the Cementing Processes in the DJ Basin of Colorado", SPE 80940, pp. 1-8, SPE, Inc., 2003.
"Liquid Stone®, Cement Technology", Product Sales Bulletin, BJ Services Company, pp. 1-2, Oct. 19, 2004.
HES brochure "Micro Matrix® Cement Retarder", H01481, Aug. 2007.
HES brochure "CFR-3™ Cement Friction Reducer", H01325, Oct. 2005.
Hess Pumice Products, Inc., "Fact Sheet", located at website www.hesspumice.com, printed from Internet Mar. 2012.
PCT Search Report for PCT International Application No. PCT/US2013/029489 dated Apr. 19, 2013.
PCT Written Opinion for PCT International Application No. PCT/US2013/029489 dated Apr. 19, 2013.
"Conduction Calorimetric Investigation of the effect of Retarders on the Hydration of Portland Cement", V.S. Ramachandran and M.S. Lowery—Thermochimica Arts, 195 (1992) 373-387.
"Competitive Adsorption of Phosphate and Phosphonates onto Goethite", Bernd Nowack and Alan T. Stone—Water Research 40 (2006) 2201-2209.
"Molecular Modeling of the Mechanism of Action of Phosphonate Retarders on Hydrating Cements", Peter V. Coveney and William Humphries—J. Chem. Soc., Faraday Trans., 1996, 92(5, 831-841).
Yana, Y. et al., (1996). "Growth and Engineering of Microporous Zeolite Films and Coatings." MRS Proceedings, 431, p. 211.
Malvern Brochure "Zetasizer Nano ZS" dated 2011.
Nissan Chemical Brochure "Snowtex®" dated 2007.
ThermPhos Brochure "Dequest® 2006" printed from the Internet on Mar. 25, 2013.
OFI Testing Equipment. Inc. Brochure "Ultrasonic Cement Analyzer" dated 2013.
HESS Brochure "Pumice Pozz for Well Cements" dated 2013.
BASF Brochure "Oilfield Chemicals Product Range" dated Jul. 2010.
Halliburton Brochure "Micro Matrix®" dated Nov. 2006.
ThermPhos Brochure "Dequest® 2066" printed from the Internet on Nov. 18, 2013.
Benge, O.G.et al., "Evaluation of Blast Furnace Slag Slurried for Oilfield Application" SPE 27449, pp. 169-180, SPE, Inc., 1994.
Halliburton Brochure "Baroid" dated Mar. 25, 2010.
Allahverdi, A. et al., (2006). "Chemical activation and set acceleration of lime-natural pozzolan cement." Ceramics—Silikaty, 193-199.
Brito. A. et al., (2004). "High surface area support, catalyst derived from natural pumice." Study of pretreatment variables. Ind. Eng. Chem. Res., 443, 1659-1664.
Johnson, C.D. et al., (2007). "Zeolitisation of pumice-microporous materials on macroporous support structures derived from natural minerals." J. Mat. Chem., 17, 476-484.
Mielenz, R.C. et al., (1950). "Effect of calcination on natural pozzolans." Symposium on use of pozzolanic materials in mortars and concretes (pp. 43-92). ASTM.
Ottana, R. et al., (1982). "Hydrothermal synthesis of zeolites from pumice in alkaline and saline environment." Zeolites, 2, 295-298.
Palomo, A. et al., (2011). "Alkaline activation, procedure for transforming fly ash into new materials. Part I: Applications." World of Coal Ash (WOCA) Conference (pp. 1-14). Denver. CO:http://www.flyash.info/.
Pisklak. T.J. et al., (2004). "Preparation and characterization of mordenite thin films via pulsed laser deposition." Journal of Porous Materials, 11(4), 191-209.
Rebrov, E.V. et al., (2009). "Sol-gel synthesis of zeolite coatings and their application in catalytic microstructured reactors." Catalysis in Industry, 1(4), 322-347.
Saija, L.M. et al., (1983). "Zeolitizalion of pumice in ash-sodium salt solutions." Mat. Chem. Phys., 8, 207-216.

(56) References Cited

OTHER PUBLICATIONS

Shi, C. (2001). "An overview on the activation reactivity of natural pozzolans." Can J. Civ. Eng., 778-786.
Shvarzman, A. et al., (2001). "Influence of chemical and phase composition of mineral admixtures on their pozzolanic activity." Advances in Cement Research, 13(1), 1-7.
U.S. Appl. No. 14/067,143, filed Oct. 30, 2013.
U.S. Appl. No. 14/032,734, filed Sep. 20, 2013.
U.S. Appl. No. 14/019,730, filed Sep. 6, 2013.
U.S. Appl. No. 14/048,486, filed Oct. 8, 2013.
U.S. Appl. No. 14/048,463, filed Oct. 8, 2013.
Southern Clay Products Data Sheet for LAPONITE RD, available from http://www.rockwoodadditives.com/ and viewed on Oct. 2013.
Daxad 19 MSDS, available from Geo Specialty Chemicals at http://www.geosc.com/ and last revised Sep. 20, 2013.
Liquimenl 5581F Product Description available from BASF at http://www.oilfield-solutions.basf.com/ viewed on Oct. 2013.
Ethacryl G Product Description available from Arkema at http://www.arkema.com/ viewed on Oct. 2013.
SA-1015 Suspending Agent Product Description available from Halliburton Energy Services at http://www.halliburton.com/ viewed on Oct. 2013.
WellLife 684 Additive Product Description available from Halliburton Energy Services at http://www.halliburton.com/ viewed on Oct. 2013.
Halad-344 Fluid Loss Additive Product Description available from Halliburton Energy Services at http://www.halliburton.com/ viewed on Oct. 2013.
U.S. Appl. No. 14/090,573, filed Nov. 26, 2013.

\* cited by examiner

USE OF SYNTHETIC SMECTITE IN SET-DELAYED CEMENT COMPOSITIONS COMPRISING PUMICE

CROSS-REFERENCE TO RELATED APPLICATIONS

The present application is a divisional of U.S. patent application Ser. No. 14/098,198, filed on Dec. 5, 2013, issued as U.S. Pat. No. 9,580,638, which is a continuation-in-part of U.S. patent application Ser. No. 13/417,001, filed on Mar. 9, 2012, issued as U.S. Pat. No. 8,851,173, the entire disclosures of which are incorporated herein by reference.

BACKGROUND

Embodiments relate to subterranean cementing operations and, in certain embodiments, to set-delayed cement compositions and methods of using set-delayed cement compositions in subterranean formations.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, set-delayed cement compositions have been used. Set-delayed cement compositions are characterized by remaining in a pumpable fluid state for at least about one day (e.g., at least about 7 days, about 2 weeks, about 2 years or more) at room temperature (e.g., about 80° F.) in quiescent storage. When desired for use, the set-delayed cement compositions should be capable of being activated whereby reasonable compressive strengths are developed. For example, a cement set activator may be added to a set-delayed cement composition whereby the composition sets into a hardened mass. Among other things, the set-delayed cement composition may be suitable for use in wellbore applications, for example, where it is desired to prepare the cement composition in advance. This may allow, for example, the cement composition to be stored prior to its use. In addition, this may allow, for example, the cement composition to be prepared at a convenient location and then transported to the job site. Accordingly, capital expenditures may be reduced due to a reduction in the need for on-site bulk storage and mixing equipment. This may be particularly useful for offshore cementing operations where space onboard the vessels may be limited.

While set-delayed cement compositions have been developed heretofore, challenges exist with their successful use in subterranean cementing operations. For example, set-delayed cement compositions prepared with Portland cement may have undesired gelation issues which can limit their use and effectiveness in cementing operations. Other set-delayed compositions that have been developed, for example, those comprising hydrated lime and quartz, may be effective in some operations but may have limited use at lower temperatures as they may not develop sufficient compressive strength when used in subterranean formations having lower bottom hole static temperatures.

A broad variety of cement densities may be required for an operation depending upon on the well conditions at the site. Set-delayed cement compositions may require unique solutions to adjust the density of the composition while maintaining a stable composition that can be stored until needed. As such, some chemical solutions may destabilize the slurry. Other solutions such as glass beads may dissolve over time providing only a temporary benefit.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Figure 1:
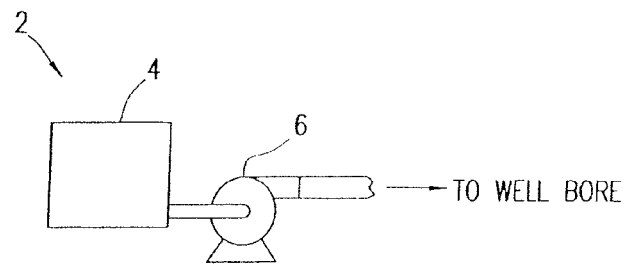
FIG. 1 illustrates a system for the preparation and delivery of a set-delayed cement composition to a wellbore in accordance with certain embodiments.

Embodiments relate to subterranean cementing operations and, in certain embodiments, to set-delayed cement compositions and methods of using set-delayed cement compositions in subterranean formations. Embodiments comprise lightweight stabilized set-delayed cement compositions for use in subterranean formations. Embodiments may comprise use synthetic smectites to stabilize the set-delayed cement compositions. The term set-delayed is used herein to refer to the composition before and after activation so long as the composition prior to activation was characterized by remaining in a pumpable fluid state for at least about one day (e.g., at least about 7 days, about 2 weeks, about 2 years or more) at room temperature (e.g., about 80° F.) in quiescent storage.

Embodiments of the set-delayed cement compositions may generally comprise water, pumice, hydrated lime, synthetic smectites, and a set retarder. Optionally, the set-delayed cement compositions may further comprise a dispersant. Embodiments of the set-delayed cement compositions may be foamed. Advantageously, embodiments of the set-delayed cement compositions may be capable of remaining in a pumpable fluid state for an extended period of time. For example, the set-delayed cement compositions may remain in a pumpable fluid state for at least about 1 day, about 2 weeks, about 2 years, or longer. Advantageously, the set-delayed cement compositions may develop reasonable compressive strengths after activation at relatively low temperatures. While the set-delayed cement compositions may be suitable for a number of subterranean cementing operations, they may be particularly suitable for use in subterranean formations having relatively low bottom hole static temperatures, e.g., temperatures less than about 200° F. or ranging from about 100° F. to about 200° F. In alternative embodiments, the set-delayed cement compositions may be used in subterranean formations having bottom hole static temperatures up to 450° F. or higher.

The water used in embodiments of the set-delayed cement compositions may be from any source provided that it does not contain an excess of compounds that may undesirably affect other components in the set-delayed cement compositions. For example, a set-delayed cement composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be present in the set-delayed cement composition in an amount in the range of from about 33% to about 200% by weight of the pumice. In certain embodiments, the water may be present in the set-delayed cement compositions in an amount in the range of from about 35% to about 70% by weight of the pumice. One of ordinary skill in the art with the benefit of this disclosure will recognize the appropriate amount of water for a chosen application.

Embodiments of the set-delayed cement compositions may comprise pumice. Generally, pumice is a volcanic rock that can exhibit cementitious properties in that it may set and harden in the presence of hydrated lime and water. The pumice may also be ground. Generally, the pumice may have any particle size distribution as desired for a particular application. In certain embodiments, the pumice may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the pumice may have a mean particle size in a range of from about 1 micron to about 200 microns, from about 5 microns to about 100 microns, or from about 10 microns to about 25 microns. In one particular embodiment, the pumice may have a mean particle size of less than about 15 microns. An example of a suitable pumice is available from Hess Pumice Products, Inc., Malad, Id., as DS-325 lightweight aggregate, having a particle size of less than about 15 microns. It should be appreciated that particle sizes too small may have mixability problems while particle sizes too large may not be effectively suspended in the compositions. One of ordinary skill in the art, with the benefit of this disclosure, should be able to select a particle size for the pumice suitable for a chosen application.

Embodiments of the set-delayed cement compositions may comprise hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in embodiments of the set-delayed cement compositions, for example, to form a hydraulic composition with the pumice. For example, the hydrated lime may be included in a pumice-to-hydrated-lime weight ratio of about 10:1 to about 1:1 or 3:1 to about 5:1. Where present, the hydrated lime may be included in the set-delayed cement compositions in an amount in the range of from about 10% to about 100% by weight of the pumice, for example. In some embodiments, the hydrated lime may be present in an amount ranging between any of and/or including any of about 10%, about 20%, about 40%, about 60%, about 80%, or about 100% by weight of the pumice. In some embodiments, the cementitious components present in the set-delayed cement composition may consist essentially of the pumice and the hydrated lime. For example, the cementitious components may primarily comprise the pumice and the hydrated lime without any additional components (e.g., Portland cement, fly ash, slag cement) that hydraulically set in the presence of water. One of ordinary skill in the art, with the benefit of this disclosure, will recognize the appropriate amount of the hydrated lime to include for a chosen application.

Embodiments of the set-delayed cement compositions may comprise a synthetic smectite. Among other reasons, a synthetic smectite may be added to aid in stabilization of the set-delayed cement composition, for example, when the set-delayed cement composition is lightweight. Synthetic smectites may be aqueous mixtures of water and synthetic trioctahedral smectites which are similar to the natural clay hectorite. In embodiments, some synthetic smectites are layered hydrous sodium lithium magnesium silicates, further, some may be modified with tetrasodiumpyrophosphate. An example of a commercially available synthetic smectite is Laponite® available from Southern Clay Products, Gonzales, Tex. Synthetic smectite may be a platelet-like clay particle with a thickness of less than about 100 nm and lateral dimensions of in a range of about 1 to about 100 nm. Without being limited by theory, synthetic smectite clay particles may swell in water and may produce gels with water at concentrations greater than 0.5%. When water is added to a synthetic smectite, it is believed that the synthetic smectite platelets become ionized and the rising osmotic pressure in the interstitial fluid may be the cause of the particle swelling. When at equilibrium in water, the faces of typical synthetic smectites are negatively charged while the edges of the synthetic smectite particles are positively charged. The polarity of the particles may be the cause of the rheological alterations in the set-delayed cement composition. In embodiments, a synthetic smectite may be added to the set-delayed cement composition as a liquid additive or as a dry powder. The synthetic smectite may be added to the set-delayed cement compositions as a dry blend or to the set-delayed cement slurry. In embodiments, the synthetic smectite may comprise a synthetic smectite with a surface modification. For example, pyrophosphate may be used to bind the edges of the synthetic smectite.

The synthetic smectite may be included in embodiments of the set-delayed cement compositions, for example, to stabilize the set-delayed cement composition as additional water is added to create a lightweight set-delayed cement composition. Where present, the synthetic smectite may be included in the set-delayed cement compositions in an amount in the range of from about 0.01% to about 5% by weight of the water, for example. In some embodiments, the synthetic smectite may be present in an amount ranging between any of and/or including any of about 0.01%, about 0.1%, about 1%, about 2%, or about 5% by weight of the water.

Embodiments of the set-delayed cement compositions may comprise a set retarder. A broad variety of set retarders may be suitable for use in the set-delayed cement compositions. For example, the set retarder may comprise phosphonic acids, such as amino tris(methylene phosphonic acid), ethylenediamine tetra(methylene phosphonic acid), diethylenetriamine penta(methylene phosphonic acid), etc.;

lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or terpolymers comprising sulfonate and carboxylic acid groups such as sulfonate-functionalized acrylamide-acrylic acid copolymers; borate compounds such as alkali borates, sodium metaborate, sodium tetraborate, potassium pentaborate; derivatives thereof, or mixtures thereof. Examples of suitable set retarders include, among others, phosphonic acid derivatives. One example of a suitable set retarder is Micro Matrix® cement retarder, available from Halliburton Energy Services, Inc. Generally, the set retarder may be present in the set-delayed cement compositions in an amount sufficient to delay the setting for a desired time. In some embodiments, the set retarder may be present in the set-delayed cement compositions in an amount in the range of from about 0.01% to about 5% by weight of the water. In specific embodiments, the set retarder may be present in an amount ranging between any of and/or including any of about 0.01%, about 0.1%, about 1%, about 2%, about 4%, or about 5%, by weight of the water. One of ordinary skill in the art, with the benefit of this disclosure, will recognize the appropriate amount of the set retarder to include for a chosen application.

As previously mentioned, embodiments of the set-delayed cement compositions may optionally comprise a dispersant. Examples of suitable dispersants include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc, Houston, Tex. The Liquiment® 514L dispersant may comprise 36% by weight of the polycarboxylated ether in water. While a variety of dispersants may be used in accordance with embodiments, polycarboxylated ether dispersants may be particularly suitable for use in some embodiments. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

In some embodiments, the dispersant may be included in the set-delayed cement compositions in an amount in the range of from about 0.01% to about 5% by weight of the pumice. In specific embodiments, the dispersant may be present in an amount ranging between any of and/or including any of about 0.01%, about 0.1%, about 0.5%, about 1%, about 2%, about 3%, about 4%, or about 5% by weight of the pumice. One of ordinary skill in the art, with the benefit of this disclosure, will recognize the appropriate amount of the dispersant to include for a chosen application.

In some embodiments, a viscosifier may be included in the set-delayed cement compositions. The viscosifier may be included to optimize fluid rheology and to stabilize the suspension. Without limitation, examples of viscosifiers include biopolymers. An example of a commercially available viscosifier is SA-1015™ available from Halliburton Energy Services, Inc., Houston, Tex. The viscosifier may be included in the set-delayed cement compositions in an amount in the range of from about 0.01% to about 0.5% by weight of the pumice. In specific embodiments, the viscosifier may be present in an amount ranging between any of and/or including any of about 0.01%, about 0.05%, about 0.1%, about 0.2%, about 0.3%, about 0.4%, or about 0.5% by weight of the pumice. One of ordinary skill in the art, with the benefit of this disclosure, will recognize the appropriate amount of viscosifier to include for a chosen application.

Embodiments of the set-delayed cement compositions may comprise a mechanical property enhancing additive. Mechanical-property-enhancing additives may be included in embodiments of the set-delayed compositions to, for example, ensure adequate compressive strength and long-term structural integrity. These properties can be affected by the strains, stresses, temperature, pressure, and impact effects from a subterranean environment. Examples of mechanical property enhancing additives include fibers, such as graphitic carbon fibers, glass fibers, steel fibers, mineral fibers, silica fibers, polyester fibers, ground rubber tires, polyamide fibers, and polyolefin fibers, among others. Specific examples of graphitic carbon fibers include fibers derived from polyacrylonitrile, rayon, and petroleum pitch. A commercial example of a mechanical-property-enhancing additive is WellLife® 684 additive available from Halliburton Energy Services, Inc. Houston, Tex. Where used, the mechanical-property-enhancing additives may be present in an amount from about 0.01% to about 5% by weight of the pumice. In specific embodiments, the mechanical-property-enhancing additives may be present in an amount ranging between any of and/or including any of about 0.01%, about 0.1%, 0.5%, about 1%, about 2%, about 3%, about 4%, or about 5% by weight of the pumice. One of ordinary skill in the art, with the benefit of this disclosure, will recognize the appropriate amount of the mechanical-property-enhancing additives to include for a chosen application.

Other additives suitable for use in subterranean cementing operations also may be included in embodiments of the set-delayed cement compositions. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, mechanical-property-enhancing additives, polyimines, and combinations thereof. In embodiments, one or more of these additives may be added to the set-delayed cement compositions after storing but prior to the placement of a set-delayed cement composition into a subterranean formation. A person having ordinary skill in the art, with the benefit of this disclosure, should readily be able to determine the type and amount of additive useful for a particular application and desired result.

Those of ordinary skill in the art will appreciate that embodiments of the set-delayed cement compositions generally should have a density suitable for a particular application. By way of example, the set-delayed cement compositions may have a density in the range of from about 4 pounds per gallon ("lb/gal") to about 20 lb/gal. In certain embodiments, the set-delayed cement compositions may have a density in the range of from about 8 lb/gal to about 17 lb/gal. In some embodiments, the set-delayed cement compositions may be lightweight. The set-delayed cement composition may be considered lightweight if it has a density of about 13 lb/gal or less. In particular embodiments, the set-delayed cement composition may have a density from about 8 lb/gal to about 13 lb/gal. Embodiments of the set-delayed cement compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

The density of the set-delayed cement compositions may be altered before injection into the wellbore. Embodiments of the set-delayed cement compositions may comprise a synthetic smectite and water to provide a lightweight composition that does not exert excessive force on formations penetrated by the wellbore. Water may be added to the slurry in addition to the water already present in the slurry in order to lower the density of the slurry further. Alternatively, enough initial water may be added to a dry blend of a set-delayed cement composition to achieve a targeted density while producing the slurry. Amongst other reasons, a synthetic smectite may be added to the set-delayed cement compositions to stabilize the set-delayed cement compositions should large amounts of water be required in order to produce a slurry with a specific density. In particular embodiments, the synthetic smectite may be added as a dry powder and/or as a liquid additive (i.e. mixed with additional water) at the well site or in the manufacture of the set-delayed cement composition. As such, the synthetic smectite, as a dry powder and/or a liquid additive, may be added to the set-delayed cement compositions when the set-delayed cement compositions are a dry blend or when the set-delayed cement compositions are a slurry. By way of example, a set-delayed cement slurry may have a synthetic smectite added immediately prior to use (e.g., as a dry powder or as a liquid additive). The amount of synthetic smectite to add to the set-delayed cement compositions is dependent upon the amount of additional water needed to achieve a specific density. In embodiments, the synthetic smectite may be added to the set-delayed cement compositions before, after, or in combination with an activator. Moreover, additional additives may be added to the set-delayed cement compositions in combination with the synthetic smectite. For example, polyethyleneimine and/or mechanical-property-enhancing additives such as carbon fibers may be mixed or blended with the synthetic smectite liquid additive or the synthetic smectite dry powder and the resulting combination added to the set-delayed cement compositions (i.e. added to either the set-delayed cement composition dry blend or to the set-delayed cement slurry). With the benefit of this disclosure, one having ordinary skill in the art will be able to choose an amount of a synthetic smectite and water to add for a specific application.

In some embodiments, a liquid additive comprising water and a synthetic smectite may be added to a set-delayed cement composition to lower the density of the set-delayed cement composition. The set-delayed cement composition may comprise water, pumice, hydrated lime, and a set retarder. Other additives described herein may also be included in the set-delayed cement composition. The set-delayed cement composition may have an initial density of from about 13 lb/gal to about 20 lb/gal. By addition of the liquid additive, the density of the set-delayed cement composition may be lowered. By way of example, a sufficient amount of the liquid additive may be added to lower the density by about 1 lb/gal or more. In some embodiments, the liquid additive may be used to lower the density to about 8 lb/gal to about 13 lb/gal. The synthetic smectite may be included in the liquid additive in amount of about 0.01% to about 2% percent by weight.

As previously mentioned, the set-delayed cement compositions may have a delayed set in that they remain in a pumpable fluid state for at least one day (e.g., at least about 1 day, about 2 weeks, about 2 years or more) at room temperature (e.g., about 80° F.) in quiescent storage. For example, the set-delayed cement compositions may remain in a pumpable fluid state for a period of time from about 1 day to about 7 days or more. In some embodiments, the set-delayed cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

When desired for use, embodiments of the set-delayed cement compositions may be activated (e.g., by combination with an activator) to set into a hardened mass. The term "cement set activator" or "activator", as used herein, refers to an additive that activates a set-delayed or heavily retarded cement composition and may also accelerate the setting of the set-delayed, heavily retarded, or other cement composition. By way of example, embodiments of the set-delayed cement compositions may be activated to form a hardened mass in a time period in the range of from about 1 hour to about 12 hours. For example, embodiments of the set-delayed cement compositions may set to form a hardened mass in a time period ranging between any of and/or including any of about 1 day, about 2 days, about 4 days, about 6 days, about 8 days, about 10 days, or about 12 days.

In some embodiments, the set-delayed cement compositions may set to have a desirable compressive strength after activation. Compressive strength is generally the capacity of a material or structure to withstand axially directed pushing forces. The compressive strength may be measured at a specified time after the set-delayed cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

By way of example, the set-delayed cement compositions may develop a 24-hour compressive strength in the range of from about 50 psi to about 5000 psi, alternatively, from about 100 psi to about 4500 psi, or alternatively from about 500 psi to about 4000 psi. In some embodiments, the set-delayed cement compositions may develop a compressive strength in 24 hours of at least about 50 psi, at least about 100 psi, at least about 500 psi, or more. In some embodiments, the compressive strength values may be determined using destructive or non-destructive methods at a temperature ranging from 100° F. to 200° F.

In some embodiments, the set-delayed cement compositions may have desirable thickening times after activation. Thickening time typically refers to the time a fluid, such as a set-delayed cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the cement compositions may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F.

Embodiments may include the addition of a cement set activator to the set-delayed cement compositions. Examples of suitable cement set activators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the set-delayed cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the activator may be provided and added to the set-delayed cement composition as a liquid additive, for example, a liquid additive comprising a monovalent salt, a polyphosphate, and optionally a dispersant.

The cement set activator may be added to embodiments of the set-delayed cement composition in an amount sufficient to induce the set-delayed cement composition to set into a hardened mass. In certain embodiments, the cement set activator may be added to the set-delayed cement composition in an amount in the range of about 0.1% to about 20% by weight of the pumice. In specific embodiments, the cement set activator may be present in an amount ranging between any of and/or including any of about 0.1%, about 1%, about 5%, about 10%, about 15%, or about 20% by weight of the pumice. One of ordinary skill in the art, with the benefit of this disclosure, will recognize the appropriate amount of cement set activator to include for a chosen application.

As will be appreciated by those of ordinary skill in the art, embodiments of the set-delayed cement compositions may be used in a variety of subterranean operations, including primary and remedial cementing. In some embodiments, a set-delayed cement composition may be provided that comprises water, pumice, hydrated lime, a synthetic smectite, a set retarder, and optionally a dispersant, a mechanical-property-enhancing additive, or polyethyleneimine. The set-delayed cement composition may be introduced into a subterranean formation and allowed to set therein. As used herein, introducing the set-delayed cement composition into a subterranean formation includes introduction into any portion of the subterranean formation, including, without limitation, into a wellbore drilled into the subterranean formation, into a near wellbore region surrounding the wellbore, or into both. Embodiments may further include activation of the set-delayed cement composition. The activation of the set-delayed cement composition may comprise, for example, the addition of a cement set activator to the set-delayed cement composition.

In some embodiments, a set-delayed cement composition may be provided that comprises water, pumice, hydrated lime, a synthetic smectite, a set retarder, and optionally a dispersant, a mechanical-property-enhancing additive, or polyethyleneimine. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 days, or longer. In some embodiments, the set-delayed cement composition may remain in storage for a time period in a range of from about 1 day to about 7 days or longer. Thereafter, the set-delayed cement composition may be activated, for example, by addition of a cement set activator, introduced into a subterranean formation, and allowed to set therein.

In primary cementing embodiments, for example, embodiments of the set-delayed cement composition may be introduced into an annular space between a conduit located in a wellbore and the walls of a wellbore (and/or a larger conduit in the wellbore), wherein the wellbore penetrates the subterranean formation. The set-delayed cement composition may be allowed to set in the annular space to form an annular sheath of hardened cement. The set-delayed cement composition may form a barrier that prevents the migration of fluids in the wellbore. The set-delayed cement composition may also, for example, support the conduit in the wellbore.

In remedial cementing embodiments, a set-delayed cement composition may be used, for example, in squeeze-cementing operations or in the placement of cement plugs. By way of example, the set-delayed composition may be placed in a wellbore to plug an opening (e.g., a void or crack) in the formation, in a gravel pack, in the conduit, in the cement sheath, and/or between the cement sheath and the conduit (e.g., a microannulus).

An embodiment comprises a method of cementing in a subterranean formation comprising: providing a set-delayed cement composition comprising pumice, hydrated lime, a cement set retarder, a synthetic smectite, and water; introducing the set-delayed cement composition into a subterranean formation; and allowing the set-delayed cement composition to set in the subterranean formation.

An embodiment comprises a set-delayed cement composition for cementing in a subterranean formation comprising: pumice, hydrated lime, a cement set retarder, a synthetic smectite, and water.

An embodiment comprises a set-delayed cementing system for cementing in a subterranean formation comprising: a set-delayed cement composition comprising: water, pumice, hydrated lime, a synthetic smectite, and a cement set retarder; a cement set activator for activating the set-delayed cement composition; mixing equipment for mixing the set-delayed cement composition and the cement set activator to produce an activated set-delayed cement composition; and pumping equipment for pumping the activated set-delayed cement composition into the subterranean formation.

Referring now to FIG. 1, the preparation of a set-delayed cement composition in accordance with example embodiments will now be described. FIG. 1 illustrates a system 2 for the preparation of a set-delayed cement composition and subsequent delivery of the composition to a wellbore in accordance with certain embodiments. As shown, the set-delayed cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the lime/settable material with the water as it is being pumped to the wellbore. In set-delayed embodiments, a re-circulating mixer and/or a batch mixer may be used to mix the set-delayed cement composition, and the activator may be added to the mixer as a powder prior to pumping the cement composition downhole. In lightweight set-delayed cement compositions, a synthetic smectite may be added as a liquid additive mixture with water. This liquid additive may be added to the set-delayed cement composition as it is mixed in mixing equipment 4.

Figure 2A:
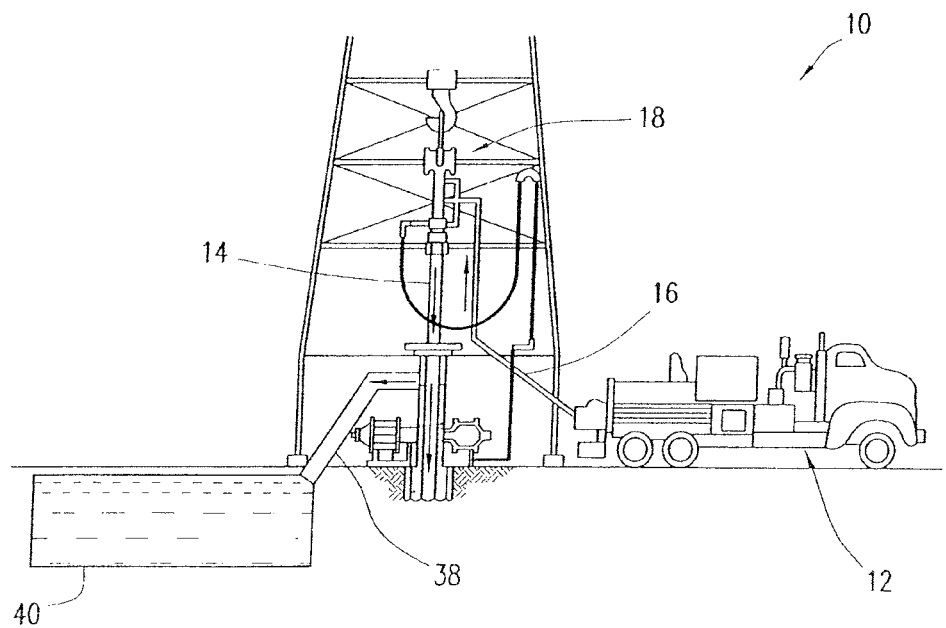
FIG. 2A illustrates surface equipment that may be used in the placement of a set-delayed cement composition in a wellbore in accordance with certain embodiments.

An example technique for placing a set-delayed cement composition into a subterranean formation will now be described with reference to FIGS. 2A and 2B. FIG. 2A illustrates surface equipment 10 that may be used in placement of a set-delayed cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a set-delayed cement composition 14 through a feed pipe 16 and to a cementing head 18 which conveys the set-delayed cement composition 14 downhole.

Figure 2B:
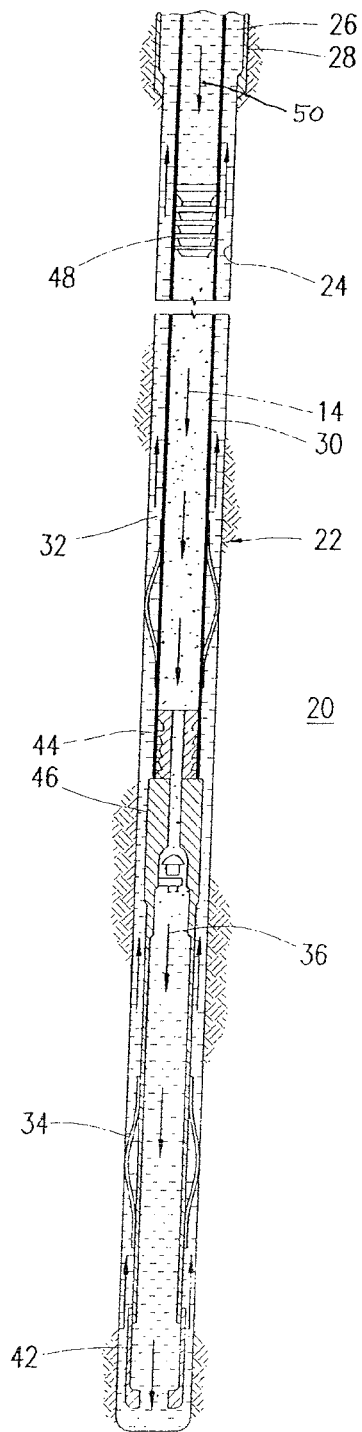
FIG. 2B illustrates the placement of a set-delayed cement composition into a wellbore annulus in accordance with certain embodiments.

Turning now to FIG. 2B, the set-delayed cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the set-delayed cement composition 14 may be pumped down the interior of the casing 30. The set-delayed cement composition 14 may be allowed to flow down the interior of the casing 30 through the casing shoe 42 at the bottom of the casing 30 and up around the casing 30 into the wellbore annulus 32. The set-delayed cement composition 14 may be allowed to set in the wellbore annulus 32, for example, to form a cement sheath that supports and positions the casing 30 in the wellbore 22. While not illustrated, other techniques may also be utilized for introduction of the set-delayed cement composition 14. By way of example, reverse circulation techniques may be used that include introducing the set-delayed cement composition 14 into the subterranean formation 20 by way of the wellbore annulus 32 instead of through the casing 30.

As it is introduced, the set-delayed cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the set-delayed cement composition 14, for example, to separate the set-delayed cement composition 14 from the fluids 36 that may be inside the casing 30 prior to cementing. After the bottom plug 44 reaches the landing collar 46, a diaphragm or other suitable device should rupture to allow the set-delayed cement composition 14 through the bottom plug 44. In FIG. 2B, the bottom plug 44 is shown on the landing collar 46. In the illustrated embodiment, a top plug 48 may be introduced into the wellbore 22 behind the set-delayed cement composition 14. The top plug 48 may separate the set-delayed cement composition 14 from a displacement fluid 50 and also push the set-delayed cement composition 14 through the bottom plug 44.

The exemplary set-delayed cement compositions disclosed herein may directly or indirectly affect one or more components or pieces of equipment associated with the preparation, delivery, recapture, recycling, reuse, and/or disposal of the disclosed set-delayed cement compositions. For example, the disclosed set-delayed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement compositions. The disclosed set-delayed cement compositions may also directly or indirectly affect any transport or delivery equipment used to convey the set-delayed cement compositions to a well site or downhole such as, for example, any transport vessels, conduits, pipelines, trucks, tubulars, and/or pipes used to compositionally move the set-delayed cement compositions from one location to another, any pumps, compressors, or motors (e.g., topside or downhole) used to drive the set-delayed cement compositions into motion, any valves or related joints used to regulate the pressure or flow rate of the set-delayed cement compositions, and any sensors (i.e., pressure and temperature), gauges, and/or combinations thereof, and the like. The disclosed set-delayed cement compositions may also directly or indirectly affect the various downhole equipment and tools that may come into contact with the set-delayed cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present embodiments, the following examples of certain aspects of some embodiments are given. In no way should the following examples be read to limit, or define, the entire scope of the embodiments.

EXAMPLES

Example 1

The following example describes a set-delayed cement composition comprising the following components:

TABLE 1

Compositional Makeup

| Component | Amount |
|---|---|
| Pumice | 250 g |
| Lime | 50 g |
| Fluid Loss Control Additive | 3 g |
| Synthetic Smectite | 3 g |
| Dispersant | 7.1 g |
| Retarder | 6.4 g |
| Water | 301 g |

The synthetic smectite was blended in 301 grams of water at 1000 rpm in a Waring® Blender for 1 minute. Following this blending step, the dispersant and the retarder were added to the synthetic smectite mixture. The mixture was then blended for another minute at 1000 rpm. Following this blending step, the pumice, lime, and fluid loss control additive were added and blended with the mixture according to API Recommended Practice for Testing Well Cements, API Recommended Practice 10B-2. The fluid loss control additive was HALAD®-344 fluid loss additive available from Halliburton Energy Services, Inc., Houston, Tex. The synthetic smectite was Laponite® RD available from Southern Clay Products, Inc., Gonzales, Tex. The dispersant was Coatex Ethacryl® G dispersant available from Coatex, Chester, S.C. The cement retarder was Dequest® 2006 available from Italmatch Chemicals, Red Bank, N.J.

After preparation, the rheological properties of the sample were measured using a Model 35A Fann Viscometer and a No. 2 spring with a Fann Yield Stress Adapter (FYSA), in accordance with the procedure set forth in API RP Practice 10B-2, Recommended Practice for Testing Well Cements. The results are presented in Table 2 below.

TABLE 2

Rheological Profile

| | FYSA Readings (Centipoise) | | | | |
|---|---|---|---|---|---|
| RPM | 3 | 6 | 100 | 200 | 300 |
| Up Reading | 7 | 10 | 32 | 50 | 69 |
| Down Reading | 3 | 4 | 29 | 48 | — |

The slurry remained stable for more than 2 weeks and displayed no free water or solids settling. The slurry was activated with 4.0 grams of $Na_2SO_4$ and 4.0 grams of sodium hexametaphosphate. The destructive compressive strength was measured by allowing the sample to cure for 24 hours in a 2" by 4" plastic cylinder that was placed in a water bath at 140° F. to form a set cylinder. Immediately after removal from the water bath, destructive compressive strengths were determined using a mechanical press in accordance with API RP 10B-2, Recommended Practice for Testing Well Cements. The sample had a 24 hour compressive strength of 121 psi. The reported compressive strengths are an average for two cylinders of each sample. The Archimedes Method was used to measure the slurry density of the sample in top, middle, and bottom portions. The density was uniform for all three sections and was 11.15 pounds per gallon.

Example 2

The following example describes a set-delayed cement composition comprising the following components:

TABLE 3

Compositional Makeup

| Component | Amount |
|---|---|
| Pumice | 125 g |
| Lime | 25 g |
| Fluid Loss Control Additive | 3 g |
| Synthetic Smectite | 3 g |
| Dispersant | 2.7 g |
| Retarder | 6.4 g |
| Water | 301 g |

The synthetic smectite was blended in 301 grams of water at 1000 rpm in a Waring® Blender for 1 minute. Following this blending step, the dispersant and the retarder were added to the synthetic smectite mixture. The mixture was then blended for another minute at 1000 rpm. Following this blending step, the pumice, lime, and fluid loss control additive were added and blended with the mixture in accordance with API RP 10B-2, Recommended Practice for Testing Well Cements. The fluid loss control additive was HALAD®-344 fluid loss additive available from Halliburton Energy Services, Inc., Houston, Tex. The synthetic smectite was Laponite® RD available from Southern Clay Products, Inc., Gonzales, Tex. The dispersant was Coatex Ethacryl® G dispersant available from Coatex, Chester, S.C. The cement retarder was Dequest® 2006 available from Italmatch Chemicals, Red Bank, N.J.

After preparation, the rheological properties of the sample were measured using a Model 35A Fann Viscometer and a No. 2 spring with a Fann Yield Stress Adapter (FYSA), in accordance with the procedure set forth in API RP Practice 10B-2, Recommended Practice for Testing Well Cements. The results are presented in Table 4 below.

TABLE 4

Rheological Profile

FYSA Readings (Centipoise)

| RPM | 3 | 6 | 100 | 200 | 300 |
|---|---|---|---|---|---|
| Up Reading | 4 | 6 | 14 | 22 | 30 |
| Down Reading | 2 | 3 | 11 | 19 | — |

The slurry remained stable for more than 2 weeks and displayed no free water or solids settling. The Archimedes Method was used to measure the slurry density of the sample in top, middle, and bottom portions. The density was uniform for all three sections and was 9.45 pounds per gallon.

Example 3

The following example describes a set-delayed cement composition comprising the following components:

TABLE 5

Compositional Makeup

| Component | Amount |
|---|---|
| Pumice | 500 g |
| Lime | 100 g |
| Fluid Loss Control Additive | 3 g |
| Dispersant | 9.2 g |
| Retarder | 6.4 g |
| Water | 301 g |

The dispersant and the retarder were added to 301 g of water. The mixture was then blended for a minute at 1000 rpm in a Waring® Blender. Following this blending step, the pumice, lime, and fluid loss control additive were added and blended with the mixture according to API RP 10B-2, Recommended Practice for Testing Well Cements. The fluid loss control additive was HALAD®-344 fluid loss additive available from Halliburton Energy Services, Inc., Houston, Tex. The dispersant was Coatex Ethacryl® G dispersant available from Coatex, Chester, S.C. The cement retarder was Dequest® 2006 available from Italmatch Chemicals, Red Bank, N.J. The slurry had a density of 13.2 pounds per gallon.

A liquid additive was prepared separate from the slurry comprising 300 g of water and 7 g of synthetic smectite. The synthetic smectite was Laponite® RD available from Southern Clay Products, Inc., Gonzales, Tex. The liquid additive was blended at 1000 rpm in a Waring® Blender for one minute. 200 mL of the 13.2 PPG cement slurry was added to the liquid additive. The final density of the slurry was 10.3 PPG.

After preparation, the rheological properties of the sample were measured using a Model 35A Fann Viscometer and a No. 2 spring with a Fann Yield Stress Adapter (FYSA), in accordance with the procedure set forth in API RP Practice 10B-2, Recommended Practice for Testing Well Cements. The results are presented in Table 6 below.

TABLE 6

Rheological Profile

FYSA Readings (Centipoise)

| RPM | 3 | 6 | 100 | 200 | 300 |
|---|---|---|---|---|---|
| Up Reading | 8 | 9 | 11 | 12 | 13 |
| Down Reading | 6 | 6 | 8 | 10 | — |

The slurry remained stable for more than 2 weeks and displayed some free water but no solids settling.

Example 4

The following example describes a set-delayed cement composition comprising the following components:

TABLE 7

Compositional Makeup

| Component | Amount |
|---|---|
| Pumice | 500 g |
| Lime | 100 g |
| Fluid Loss Control Additive | 3 g |
| Dispersant | 11.8 g |
| Retarder | 4.2 g |
| Water | 300 g |

The dispersant and the retarder were added to 300 g of water. The mixture was then blended for a minute at 1000 rpm in a Waring® Blender. Following this blending step, the pumice, lime, and fluid loss control additive were added and blended with the mixture according to API RP 10B-2, Recommended Practice for Testing Well Cements. The slurry was left to sit for 24 hours. It displayed no solids settling and was flowable. The fluid loss control additive was HALAD®-344 fluid loss additive available from Halliburton Energy Services, Inc., Houston, Tex. The dispersant was Coatex XP-1702 dispersant available from Coatex, Chester, S.C. The cement retarder was Dequest® 2006 available from Italmatch Chemicals, Red Bank, N.J.

Three individual samples of 300 g each were taken from the cement slurry and each sample was mixed with a different liquid additive comprising synthetic smectite and water. The liquid additive compositions are described in Table 8 below.

TABLE 8

Liquid Additive Makeup

| Liquid Additive Mixture 1 | | Liquid Additive Mixture 2 | | Liquid Additive Mixture 3 | |
|---|---|---|---|---|---|
| Component | Amount | Component | Amount | Component | Amount |
| Water | 100 g | Water | 100 g | Water | 100 g |
| Synthetic Smectite | 1 g | Synthetic Smectite | 1 g | Synthetic Smectite | 1 g |
| Polyethyleneimine | 1 g | Polyethyleneimine | 1 g | Viscosifier | 0.25 g |
| | | Carbon Fibers | 3.33 g | Carbon Fibers | 3.33 g |

The synthetic smectite was Laponite® RD available from Southern Clay Products, Inc., Gonzales, Tex. The carbon fibers were WeilLife® 684 additive available from Halliburton Energy Services, Inc. Houston, Tex. The viscosifier was SA-1015™ available from Halliburton Energy Services, Inc., Houston, Tex. The polyethyleneimine is a linear poly(ethyleneimine) with an average molecular weight of 60,000 daltons, it is available commercially from Sigma-Aldrich, St. Louis, Mo. Each liquid additive mixture was blended at 1000 rpm in a Waring® Blender for one minute.

Each slurry was allowed to sit for 24 hours. No solids settling or free water were observed in any sample. The slurry was activated with 4.0 grams of $Na_2SO_4$ (1.3% by weight of the pumice) and 4.0 grams of sodium hexametaphosphate (1.3% by weight of the pumice). The destructive compressive strength was measured by allowing each sample to cure for 24 hours in a 2" by 4" plastic cylinder that was placed in a water bath at 140° F. to form a set cylinder. Immediately after removal from the water bath, destructive compressive strengths were determined using a mechanical press in accordance with API RP 10B-2, *Recommended Practice for Testing Well Cements*. The reported compressive strengths are an average for two cylinders of each sample. The Archimedes Method was used to measure the slurry density of the sample in top, middle, and bottom portions. The density was uniform for all three slurries and was 11.2 pounds per gallon. Compressive strength data is displayed in Table 9 below.

TABLE 9

Compressive Strength Profile

| Liquid Additive Mixture 1 | Liquid Additive Mixture 2 | Liquid Additive Mixture 3 |
|---|---|---|
| 366 ± 13 psi | 430 psi<br>17% increase | 398 ± 6 psi<br>9% increase |

As illustrated in the table above, the liquid additive mixtures with the carbon fibers provided an 11.2 ppg set-delayed cement composition and a 9-17% increase in 24 hour compressive strength.

Example 5

The following example describes a set-delayed cement composition comprising the following components:

TABLE 10

Compositional Makeup

| Component | Amount | Unit |
|---|---|---|
| Pumice | 100 | % bwoP |
| Lime | 19.8 | % bwoP |
| Weighting Agent | 2.06 | % bwoP |
| Dispersant | 1.8 | % bwoP |
| Primary Retarder | 0.06 | Gal/sk |
| Secondary Retarder | 0.516 | % bwoP |
| Water | 64.1 | % bwoP |

% bwoP = percent by weight of the pumice;
Gal/sk = gallons per 46 lb. sack of pumice The mixture was then blended for one minute at 1000 rpm Waring® Blender for 1 minute according to API RP 10B-2, *Recommended Practice for Testing Well Cements*. The weighting agent was MICROMAX® weight additive available from Halliburton Energy Services, Inc., Houston, Tex. The dispersant was Coatex Ethacryl® G dispersant available from Coatex, Chester, S.C. The primary cement retarder was Micro Matrix® Cement Retarder available from Halliburton Energy Services, Inc., Houston, Tex. The secondary cement retarder was HR®-5 retarder available from Halliburton Energy Services, Inc., Houston, Tex.

After preparation, an experimental sample comprising a liquid additive was prepared. The liquid additive comprised synthetic smectite (i.e. Laponite® RD available from Southern Clay Products, Inc., Gonzales, Tex.) and water. 250 g a 1% (by weight of water) aqueous synthetic smectite liquid additive was added to 600 g of the cement slurry described in Table 10 above. 16.6 g (5.2% by weight of the pumice) of $CaCl_2$ was then added to this resulting mixture to activate the slurry. The slurry was then blended for 30 seconds at 4000 rpm in a Waring® Blender.

A control sample was then prepared that comprised 600 of the cement slurry described in Table 10 above and an additional 250 g of water. No synthetic smectite was present in the control sample. 16.6 g (5.2% by weight of the pumice) of $CaCl_2$ was then added to this resulting mixture to activate the slurry. The slurry was then blended for 30 seconds at 4000 rpm in a Waring® Blender.

The experimental sample and the control sample were then placed into 2" by 4" plastic cylinders that were placed in a water bath at 140° F. for one week to form a set cylinder. The Archimedes Method was used to measure the slurry density of each sample in top, middle, and bottom portions. The densities are described in Table 11 below.

TABLE 11

Sample Densities

| Experimental Sample | | Control Sample | |
|---|---|---|---|
| Top | 10.810 | Top | 9.9086 |
| Middle | 10.946 | Middle | 9.9395 |
| Bottom | 10.987 | Bottom | 10.253 |

The control sample had free water and solids settling. The experimental sample had no free water and only minimal solids settling was observed.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of making a reduced density set-delayed cement composition for cementing in a subterranean formation comprising, the method comprising:
   preparing a set-delayed cement composition comprising:
      pumice;
      hydrated lime;
      a cement set retarder; and
      water;
   wherein the set-delayed cement composition has an initial density of from about 13 lb/gal to about 20 lb/gal and wherein the set-delayed cement composition is capable of remaining in a pumpable fluid state for at least about 7 days; and
   adding water and synthetic smectite to the set-delayed cement composition to reduce the density of the set-delayed cement composition by at least 1 lb/gal to produce the reduced density set-delayed cement composition, wherein the synthetic smectite is added in an amount sufficient to stabilize the reduced density set-delayed cement composition.

2. The method of claim 1 wherein the pumice has a mean particle size in a range of about 10 micron to about 25 microns.

3. The method of claim 1 wherein the pumice and the hydrated lime are present in a weight ratio of pumice to hydrated lime of about 10:1 to about 1:1.

4. The method of claim 1 wherein the hydrated lime is provided as calcium oxide.

5. The method of claim 1 wherein the cement set retarder comprises at least one retarder selected from the group consisting of a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, and any mixture thereof.

6. The method of claim 1 wherein the set retarder is present in an amount of about about 0.01% to about 5% by weight of the water.

7. The method of claim 1 wherein the synthetic smectite has a thickness of less than about 100 nm and lateral dimensions of in a range of about 1 to about 100 nm, the synthetic smectite being present in an amount of about 0.01% to about 5% by weight of the added water.

8. The method of claim 1 wherein the water is present in the set-delayed cement composition in an amount in the range of from about 33% to about 200% by weight of the pumice.

9. The method of claim 1 wherein the set-delayed cement composition further comprises carbon fibers, wherein the carbon fibers are present in an amount from about 0.01% to about 5% by weight of the pumice.

10. The method of claim 1 wherein the set-delayed cement composition further comprises polyethyleneimine.

11. The method of claim 1 wherein the set-delayed cement composition further comprises a dispersant and wherein the dispersant comprises at least one dispersant selected from the group consisting of a sulfonated-formaldehyde-based dispersant, a polycarboxylated ether dispersant, and any combination thereof.

12. The method of claim 1 further comprising a viscosifier wherein the viscosifier is present in an amount of about 0.01% to about 0.5% by weight of the pumice.

13. The method of claim 1 further comprising a cement set activator wherein the cement set activator is selected from the group consisting of zeolites, amines, silicates, zinc formate; calcium acetate; Groups IA and IIA hydroxides, monovalent salts, divalent salts, nanosilica, polyphosphates; and combinations thereof.

14. The method of claim 1 further comprising an activator comprising a polyphosphate and a monovalent salt.

15. The method of claim 14 wherein the polyphosphate comprises a polymeric metaphosphate salt.

16. The method of claim 1 wherein the synthetic smectite is provided as at least one of a dry powder and a mixture with water.

17. The method of claim 1 further comprising storing the set-delayed cement composition for a time period of at least one day before the step of adding the water and the synthetic smecite.

18. A method of preparing a set-delayed cement composition for cementing in a subterranean formation comprising, the method comprising:
   preparing a set-delayed cement composition comprising:
      pumice;
      hydrated lime;
      a cement set retarder;
      a mechanical property enhancing additive comprising carbon fibers; and
      water;
   wherein the set-delayed cement composition is capable of remaining in a pumpable fluid state for a time period of at least about 7 days and wherein the set-delayed cement composition has an initial density of from about 13 lb/gal to about 20 lb/gal: and
      adding a liquid additive comprising water and synthetic smectite to the set-delayed cement composition to reduce the density of the set-delayed cement composition by at least 1 lb/gal.

19. The method of claim 18 wherein the carbon fibers are present in an amount from about 0.01% to about 5% by weight of the pumice.

20. The method of claim 18 wherein the set-delayed cement composition further comprises a dispersant and wherein the dispersant comprises at least one dispersant selected from the group consisting of a sulfonated-formaldehyde-based dispersant, a polycarboxylated ether dispersant, and any combination thereof.

* * * * *